United States Patent
Sherry

Patent Number: 6,081,984
Date of Patent: *Jul. 4, 2000

[54] METHOD OF FASTENING MEMBERS OF AN ASSEMBLY

[75] Inventor: Neil J Sherry, Stevenage, United Kingdom

[73] Assignee: Avdel Textron Limited, Hertfordshire, United Kingdom

[*] Notice: Under 35 U.S.C. 154(b), the term of this patent shall be extended for 385 days.

[21] Appl. No.: 08/593,334

[22] Filed: Jan. 29, 1996

[30] Foreign Application Priority Data

Jan. 31, 1995 [GB] United Kingdom ............... 9501849

[51] Int. Cl.⁷ ................................................ B23P 11/00
[52] U.S. Cl. ........................ 29/432.2; 29/456; 29/523; 29/524.1; 29/525.06
[58] Field of Search .................. 29/432.2, 456, 29/524.1, 525.06, 523; 72/327

[56] References Cited

U.S. PATENT DOCUMENTS

| | | | |
|---|---|---|---|
| 609,633 | 8/1898 | Stewmüller | 29/525.06 X |
| 2,180,545 | 11/1939 | Parsons et al. | 72/327 |
| 3,108,371 | 10/1963 | Munse | 72/327 |
| 3,353,436 | 11/1967 | Jaworski | 72/327 X |

FOREIGN PATENT DOCUMENTS

| | | | |
|---|---|---|---|
| 2 465 037 | 3/1981 | France . | |
| 507358 | 6/1939 | United Kingdom | 29/523 |
| 2 017 426 | 10/1979 | United Kingdom . | |
| 2 081 833 | 2/1982 | United Kingdom . | |
| 2 140 891 | 12/1984 | United Kingdom . | |
| 2222648 | 3/1990 | United Kingdom . | |

*Primary Examiner*—Joseph M. Gorski
*Attorney, Agent, or Firm*—Oblon, Spivak, McClelland, Maier & Neustadt, P.C.

[57] ABSTRACT

Members of an assembly, a first of which has an aperture and a second of which is of deformable sheet-like material, are fastened together by piercing and deforming the second member using a punch and die to provide a pierced aperture having a peripheral wall of helical form analogous to a screw-thread, assembling the members together with the apertures aligned, inserting a tubular fastener having a head and a shank into the apertures so that the head abuts a face of the first member and the shank extends through the second member, and then expanding at least part of the shank within the pierced aperture of the second member and thereby causing the peripheral wall of the pierced aperture to impress a helical peripheral groove into the external surface of the shank of the fastener. The shank can be expanded by pulling a tapering mandrel head into or through it. The fastener is made to facilitate its removal by unscrewing from the fastened assembly by providing or forming wrenching surfaces in its bore or on its head for engagement with a key, screwdriver, spanner or the like.

11 Claims, 2 Drawing Sheets

METHOD OF FASTENING MEMBERS OF AN ASSEMBLY

This invention relates to a method of fastening members of an assembly, such as sheets or the like, and more particularly, although not exclusively, a method of fastening which can be performed rapidly and which will permit the fastened members to be unfastened and, if necessary, re-fastened, with simple tools and without difficulty.

It is often necessary, in the construction of apparatus, machines or other complex structures, to fasten together sheets or sheet-like members. For example, one such member might be a sheet of supporting material, and another member might be a panel of sheet material or a functional component of an apparatus which is required to be fastened to the supporting material.

The methods and means for effecting fastening in such situations are innumerable, and include the use of nuts and bolts, rivets, welding and other means. However, while some of the known methods permit fastening to be effected rapidly, as in the case of blind riveting, it is then difficult or time consuming to separate the fastened parts, and methods which result in the fastened parts being easily separable either employ elaborate fastening means, or are time consuming in effecting the initial fastening.

It is known to provide what is known as a "sheet-nut" for engagement with a screw, particularly a sheet-screw having a coarse thread, by deforming a small piece of sheet material, such as steel, to form an aperture having a helical peripheral wall which resembles and functions as a single turn of internal screw-thread into which a screw can be threadedly engaged.

Thus a sheet-nut is usually a small device intended as part of a two-part fastener which, in co-operation with a screw, can be used to fasten members of a workpiece together.

With a view to facilitating the fastening of a member having an apertured sheet-like part to a sheet-metal supporting member, we have now devised a method of fastening whereby the assembled members may be rapidly fastened together and thereafter, if desired, may be separated.

According to the present invention there is provided a method of fastening members of an assembly together, a first one of said members having an aperture, and a second one of said members being of deformable sheet-like material, comprising the steps of piercing through the second one of the members to form a pierced aperture therethrough and forming a cleavage extending substantially radially outwardly of the pierced aperture, deforming material of the second member peripherally of the pierced aperture and thereby moving peripheral material on one side of the cleavage out of the plane of peripheral material adjacent thereto and on the opposite side of the cleavage, and thereby providing the second member with a wall peripherally of the pierced aperture and of helical form analogous to a screw-thread, assembling the apertured members together in substantially face to face relationship with their apertures in axial alignment, inserting a tubular fastener having a shank and an enlarged head through the aligned apertures so that the head of the fastener abuts a face of the said first one of the members and the shank of the tubular fastener extends through the aligned apertures and projects beyond the said second one of the members, and then radially expanding at least part of the shank of the tubular fastener to an external diameter greater than the diameter of the pierced aperture in the said second member, and thereby causing the peripheral wall of said pierced aperture to impress a peripheral groove of helical form into the external surface of the shank of the tubular fastener.

The step of piercing through the second member may be performed in any convenient manner such as, for example, by cutting or by shearing, and more particularly the pierced aperture may be formed by drilling. However, in a preferred form of the invention the piercing of the second member is performed by shearing by means of a punch and die which may, conveniently, also be used to perform the steps of forming the said cleavage and of deforming the material peripherally of the pierced aperture.

Part of the shank of the fastener may be expanded by pulling into its bore a swaging head of a riveting mandrel.

The shank of the tubular fastener may be radially expanded by pulling through its bore a pull-through riveting mandrel of the kind comprising an elongate pulling stem and an enlarged swaging head.

The method may include the step of changing the cross-sectional shape of the bore of the tubular fastener so that the radially expanded fastener has a non-circular keying shape, to facilitate rotation and removal of the fastener.

Peripheral material on the said opposite side of the cleavage may be deformed in a direction opposite to that in which the peripheral material on the said one side of the cleavage is deformed.

The second member may be deformed to provide a stand off which projects from a face of the member in a region spaced from the pierced aperture.

The first member may be assembled into engagement with the stand off of the second member so as to be spaced from the said face of the second member by the standoff.

The standoff may be made substantially concentric with the pierced aperture and spaced radially outwardly of the said deformed peripheral material.

Preferred forms of the invention will now be described, by way of example, with reference to the accompanying drawings, in which.

In the embodiment of the invention to be described by way of example, members of an electrical lighting assembly are to be fastened together. A first member of the assembly is an electrical choke unit having a housing formed of sheet metal and provided with one or more apertured lugs to facilitate fastening of the unit to a support, and a second member of the assembly is an elongate support member formed of thin steel sheet which has been bent to form a channel of U-shaped cross-section, to which the choke unit is to be fastened.

In performing this embodiment of the method the second member is pierced to provide an aperture and is shaped peripherally of the aperture to the form of a sheet metal nut. These operations are performed on the second member by the action of tooling comprising a pair of suitable co-operating dies.

Figure 1:
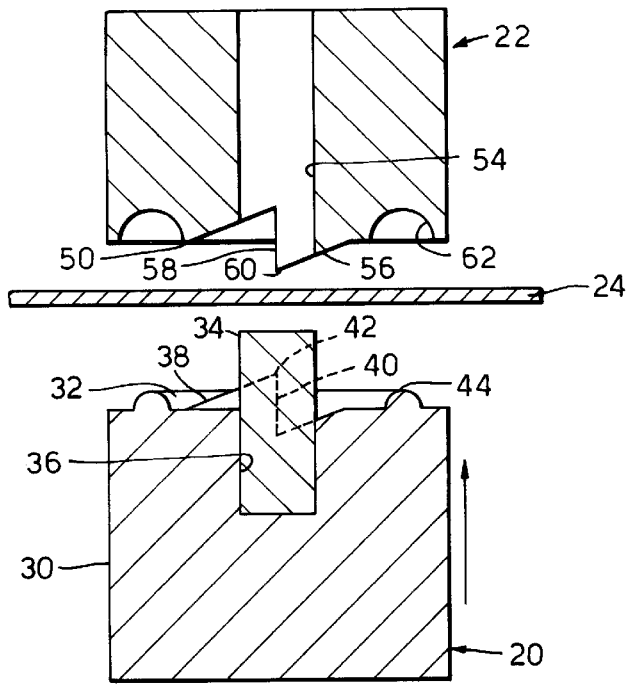
FIG. 1 is a sectional elevation showing part of a workpiece in the form of sheet material intended for use as a support member of an assembly, and a pair of dies for piercing and shaping the workpiece.
Figure 2:
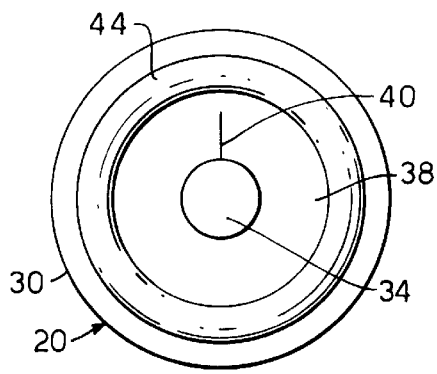
FIG. 2 is a plan view of one of the dies.

Referring now to FIG. 1 of the drawings, the tooling comprises a press (not shown) in which a male die 20 and a female die 22 are mounted for reciprocatory relative movement towards and away from each other along a common axis so as to act respectively on mutually opposite sides of a workpiece 24 disposed between them. In this embodiment, the workpiece 24 is the elongate support member for the lighting assembly previously referred to.

The male die 20 comprises a die body 30 having a working face 32 and a piercing pin 34 which is located in an axial recess 36 formed in the centre of the working face 32, and may alternatively be regarded as a punch.

The working face 32 of the male die is countoured in a region peripherally of the pin 34 and immediately adjacent thereto to present a helical surface 38, of either left or right hand as desired, which extends peripherally of the pin, and a face 40 which extends radially outwardly from the pin and longitudinally parallel to the axis of the die. Thus, the helical surface 38 makes one turn as it extends away from the face 40 and around the pin and returns to the face 40, and follows a helix having a pitch which corresponds to the axial length of the face 40.

The pitch and, usually, the hand of the said helix is made appropriate to that of a coarse right-hand screw-thread for a screw having a minor diameter the same as that of the piercing pin 34, although in the case of the dies as illustrated the hand is appropriate to form a left-hand thread.

The die presents a cutting edge 42 along a radial line at which the helical surface 38 meets the face 40.

Peripherally of the helical surface 38, the working face 32 has an annular groove-forming land 44. In this embodiment, the land is of substantially semi-circular shape in cross-section, but it could, as an alternative, be of any suitable shape such as to taper towards an apex.

In this embodiment, the pin 34 has a diameter of 4.0 mm, and the external diameter of the annular land 44 is 13 mm.

The female die 22 has a working face 50 which is of complementary shape to that of the male die, and presents an annular groove into which sheet metal material can be forced and shaped by the action of the land 44 of the male die 20. The die 22 has an axial hole 54 into which the pin 34 of the die 20 can enter when piercing sheet metal, and, peripherally of the hole, a helical surface 56 of the same hand as that of the die 20.

The helical surface 56 extends through one turn peripherally of the hole 54, and the working face 50 presents a radial longitudinal face 58 extending between the longitudinally spaced regions of the helical surface 56, and a radially extending cutting edge 60, along a line at which the helical surface 56 meets the longitudinal face 58.

As mentioned, the working face 50 of the die 22 has an annular groove 62 which extends peripherally of the helical surface 56, and which is of semi-circular shape in cross-section.

The dies 20, 22 are mounted in the press with their working faces opposed and with the pin 34 aligned axially with the hole 54, and with their cutting edges 42, 60 substantially aligned so as to be able to perform a shearing action on a sheet-like workpiece between them.

Figure 3:
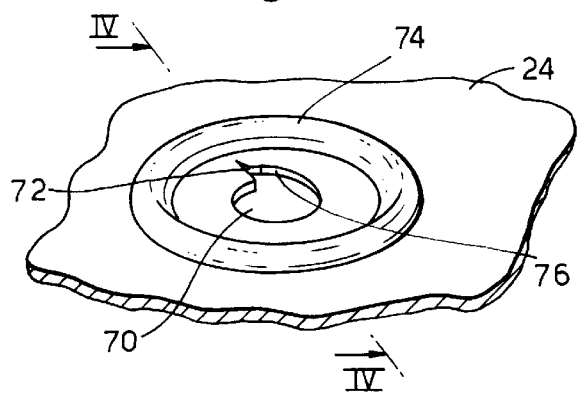
FIG. 3 is a perspective view of part of the workpiece after piercing and shaping.
Figure 4:
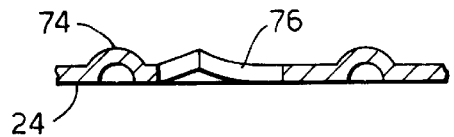
FIG. 4 is a sectional elevation on the line IV–VI of FIG. 3.

In performing the method of the invention, the workpiece 24 is disposed between the working faces of the dies 20, 22, so as to lie in a plane transverse to the direction of relative movement of the dies, and the dies are then closed together so as to act on mutually opposite sides of the workpiece, to deform the workpiece to the shape shown in FIGS. 3 & 4 to which also reference should now be made.

As the dies move relatively towards each other, the workpiece is first supported by the female die 22 and subjected to a shearing action between the piercing pin 34 of the male die 20 and the centrally apertured working face of the die 22, so that a circular aperture 70 (shown in FIG. 3) is pierced through the workpiece, and the pin 34 enters the hole 54 of the female die. As the dies close further, the working face of the die 20 engages the workpiece in a region opposite to that supported by the die 22 and, together, the dies deform the workpiece to the form of a sheet nut. Thus, the cutting edges co-operate to shear the workpiece along a line extending radially outwardly from the aperture pierced by the pin, and simultaneously the land 44 and the helical surface 30 of the die 20 co-operate with the groove 62 and helical surface 56 of the die 22 to deform the workpiece to the shape shown in FIGS. 3 and 4.

Thus, more particularly, having pierced the aperture 70, the dies shear the workpiece to form a linear cleavage 72 which extends radially from the aperture 70, and then deform the material around the aperture to the form of a sheet-nut, with the material adjacent to the cleavage and on one side thereof being deformed out of the plane of the workpiece and to one side thereof, and material adjacent to the other side of the cleavage being deformed out of the plane of the workpiece in the opposite direction and to the other side of the workpiece. Simultaneously, the annular land 44 deforms material of the workpiece into the annular groove 52, thus forming an annular stand off 74 which projects from the plane of the face of the workpiece, peripherally of the pierced aperture and the deformed region, on the side of the workpiece supported by the die 22.

The formation of the cleavage 72 facilitates the deformation of material adjacent thereto in mutually opposite directions. Instead of forming a linear cleavage, the dies may be shaped so as to punch out a strip so as to form a slot of appreciable width and length extending radially from the aperture, to serve the same purpose as the cleavage.

The deformation of the material peripherally of the aperture serves to provide the aperture 70 with a peripheral wall 76 of helical form, broken by the cleavage, and which corresponds generally to the form of an internal screw-thread. In the illustrated example, the thread is a single turn of a right-hand screw-thread.

As the pierced and deformed region of the workpiece corresponds both structurally and functionally to a sheet-nut, this region will herein after be referred to generally as a "nut region". However, it is to be appreciated that in the method of the invention, the nut region is provided as a part of one of the members of the assembly to be fastened together, rather than as an accessory fastening means which is additional to the members of the workpiece. Moreover, the invention makes use of the nut region in a manner which is different from the customary manner of use of sheet-nuts, as will become apparent.

Figure 5:
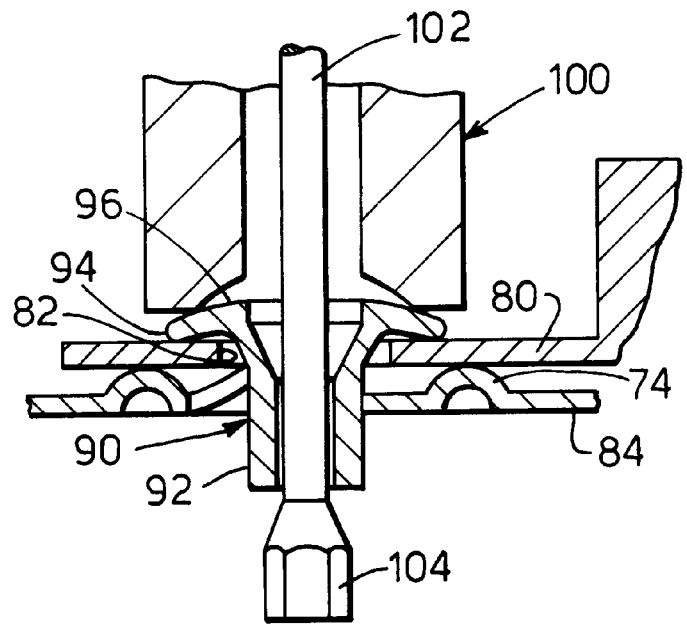
FIG. 5 is a fragmentary sectional view showing a stage in the fastening of a first member of an assembly to a second member.

Referring now to FIG. 5, an electrical choke unit, shown fragmentarily and having a mounting lug 80 provided with an aperture 82, is assembled together with a support member 84 which previously constituted the workpiece 24 which has now been pierced and deformed to provide a nut region as previously described.

The lug 80 is a sheet-like part of the casing of the choke unit, and the choke unit is positioned with the aperture 82 in register with the aperture 70 of the member 84 on the side thereof having the standoff 74, so that the lug 80 lies parallel to the general plane of the support member and is slightly spaced there from by the stand off.

A headed tubular fastener is then used to fasten the members 80 and 24 together, as will now be explained.

The fastener used in this example is indicated by the reference 90, and comprises an elongate, generally cylindrical, tubular shank 92, and a radially enlarged head 94 having a slightly rounded upper surface 96 remote from the shank 92, and a dished under-surface.

A bore 98 extends throughout the head and shank, and is flared towards the head end of the fastener, and the shank is externally flared adjacent to the head to facilitate expansion of the shank without distortion of the head.

The fastener is inserted into the registering apertures so that the head 94 abuts the lug 80, and the shank extends through the members and projects beyond the support member 84.

The fastener is then radially expanded so as to cause the shank to expand generally to a diameter slightly greater than the diameter of the aperture 70 in the support member 84, thereby causing the screw-thread like peripheral wall of the aperture 70 to embed in the external surface of the shank 92.

In this embodiment, this expansion of the fastener is effected by means of installation apparatus of a kind which is well-known in the art of blind-rivetting. The apparatus used in this embodiment comprises a generally annular nose 100 formed by a pair of similar co-operating jaws, and an elongate pull-through riveting mandrel 102 having a radially enlarged swaging head 104 of hexagonal cross-section, and means (not shown) for pulling the head of the riveting mandrel through the bore of a fastener supported at its head end by the nose of the installation apparatus.

Thus, as shown in FIG. 5, the apparatus is shown with the nose 100 abutting the rivet head, and the swaging head waiting to be drawn into and through the bore of the fastener.

Figure 6:
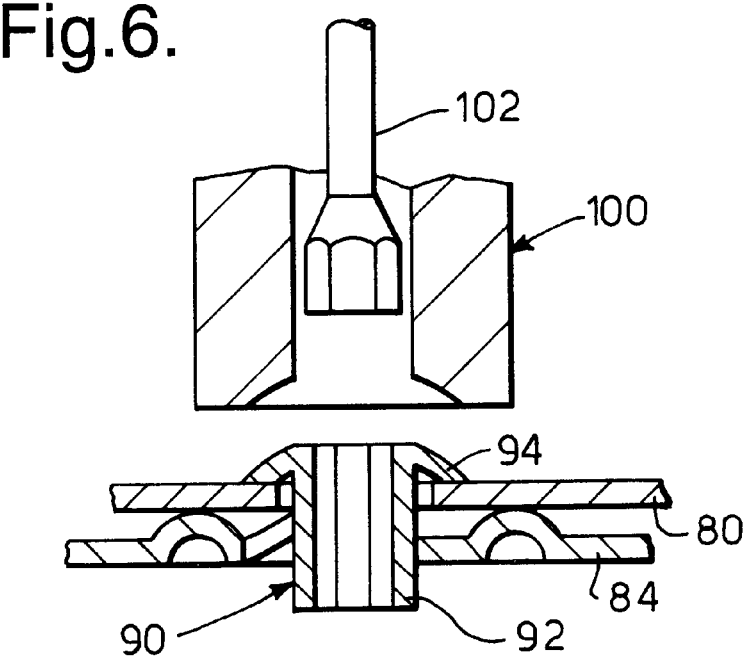
FIG. 6 is a view similar to FIG. 5 showing the members fastened together.

FIG. 6 shows the fastener having been expanded into engagement with the wall of the aperture 70 by pulling of the swaging head entirely through the fastener.

Thus, the members of the assembly are fastened together.

The use of a swaging head 104 of hexagonal cross-section causes the enlarged bore of the installed fastener to assume a hexagonal cross-sectional shape, as shown in FIG. 6, and this enables the installed fastener to be removed easily, if desired, by engaging a hexagonal key in the bore, and rotating the fastener in the manner of the screw.

It will be appreciated that the hexagonal swaging head forms wrench-engaging surfaces in the bore of fastener, and that this effect could be achieved by means of a swaging head having a non-circular cross-sectional shape other than hexagonal.

In this embodiment, the nose 100 has a concavely recessed surface which initially engages only the outer periphery of the head 94 of the fastener, as shown in FIG. 5, but, due to the reaction between the mandrel head 104 and the nose during expansion of the fastener, the periphery of the head 94 is deformed towards the shank, thereby ensuring that the lug 80 is clamped tightly to the support member 84.

The installation apparatus may be of the kind in which a plurality of the fasteners are loaded onto the pull-through mandrel and fed through the nose one at a time, enabling fasteners to be installed sequentially in rapid succession.

In another embodiment, instead of expanding the shank of the fastener by means of a mandrel which forms a re-usable part of the installation apparatus, the fastener itself is associated with a mandrel which can be engaged and pulled to expand the shank, by blind-rivet installation apparatus which is similar to that previously described except that it does not itself include a pull-through mandrel. In this embodiment, the fastener comprises a headed tubular body and includes a mandrel comprising an elongate stem, a radially enlarged swaging head which tapers towards the stem at one end of the stem, and a frangible breakneck joining the swaging head to the stem. In this embodiment, the body of the fastener comprises a cylindrical shank and a radially enlarged fastener head at one end of the shank, and a bore which extends axially throughout the shank and fastener head. The mandrel is disposed in the bore of the body with the stem extending through the bore and projecting from the fastener head end of the body, and the swaging head of the mandrel being disposed adjacent to the end of the shank remote from the fastener head.

The bore of the body of the fastener of this embodiment is constricted in the region of the fastener head so that, when the stem of the mandrel is gripped and pulled so as to draw the swaging head into the bore and thereby expand the shank progressively from the tail end towards the fastener head, the constriction prevents the swaging head from being pulled entirely through the bore, and consequently the mandrel breaks at the breakneck, leaving the swaging head within the bore having expanded the shank as far as the constriction, while the stem of the mandrel is withdrawn and discarded.

As the swaging head is not pulled entirely through the bore in this embodiment, it cannot form wrench engaging surfaces suitable to facilitate subsequent removal of the fastener body. However, in this embodiment the fastener head is formed with a diametrical slot into which a screwdriver may be engaged in order to facilitate rotation and removal of the fastener body. Alternatively, instead of a slot, the head could be made of a polygonal shape, such as square or hexagonal so as to provide its peripheral surface with wrench engaging surfaces to facilitate removal of the fastener.

In this embodiment it is only necessary to expand a part of the shank of sufficient length extending from the end remote from the fastener head for the peripheral wall 76 of the aperture 70 to embed in the surface of the expanded part of the shank.

It will be appreciated that the second or support, member of the assembly may be provided with a plurality of nut regions to enable one or more other members to be fastened thereto at a plurality of spaced locations.

The invention is not limited to the details of the forgoing embodiments, but is defined by the claims.

What is claimed is:

1. A method of fastening two members together, comprising the steps of:

provding a first member having an aperture extending therethrough;

providing a second planar member having a thickness in a direction transverse to its planar extent;

piercing said second member, thereby forming an aperture extending therethrough and a cleavage extending substantially radially outwardly from said aperture and through the thickness of said second member, with said aperture and cleavage being co-planar with said second member;

deforming only a portion of said second member that defines said aperture and cleavage out of the plane of said second member, thereby forming said portion into a wall having a thread-like helical form analogous to a screw-thread;

bringing said first and second members together in a substantially face to face relationship with their apertures in axial alignment with each other;

inserting a tubular fastener having a shank and an enlarged head through the aligned apertures so that the head abuts against an outer face of said first member, and the shank extends through the aligned apertures and projects beyond an outer face of said second member; and then radially expanding said shank to an external diameter greater than the diameter of said aperture in said second member, thereby causing said wall defining said aperture to impress a peripheral groove corresponding in shape to said wall into said shank, such that said members may be separated from each other by rotating said fastener relative to said second member so that said wall travels within said groove and causes said fastener to be unscrewed from said second member.

2. The method of claim 1, wherein said piercing step includes shearing said second member between a punch and die.

3. The method of claim 1 or 2, wherein said deforming step includes deforming said portion between a punch and die.

4. The method of claim 1 or 2, including performing said piercing step and said deforming step during a single stroke of a punch and die.

5. The method of claim 1, and further comprising the step of forming a standoff in said second member adjacent to said aperture and cleavage.

6. The method of claim 5, wherein said standoff is annular.

7. The method of claim 6, wherein said standoff surrounds said aperture and cleavage.

8. The method of claim 1, wherein said radially expanding step includes pulling a mandrel through said shank.

9. The method of claim 8, wherein said pulling step causes an inner wall of said fastener to be changed from a circular shape to a keying shape providing wrenching surfaces.

10. The method of claim 9, wherein said keying shape is hexagonal.

11. The method of claim 1 and further including the step of deforming said enlarged head radially inwardly.

* * * * *